July 22, 1969　　　S. C. SPINELLA　　　3,456,347
DENTAL RESTORATION AND DENTAL TOOTH STRUCTURES
Filed Oct. 17, 1966　　　4 Sheets-Sheet 1

INVENTOR.
S. CHARLES SPINELLA
BY
Morgan, Finnegan, Durham & Pine
ATTORNEYS.

July 22, 1969     S. C. SPINELLA     3,456,347
DENTAL RESTORATION AND DENTAL TOOTH STRUCTURES Filed Oct. 17, 1966     4 Sheets-Sheet 2

INVENTOR.
S. CHARLES SPINELLA

BY
Morgan, Finnegan, Durham & Pine
ATTORNEYS.

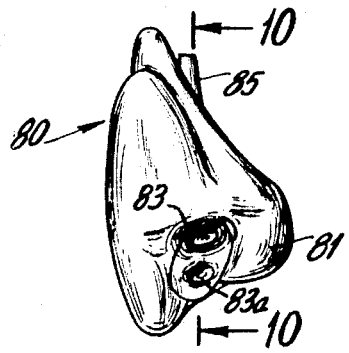
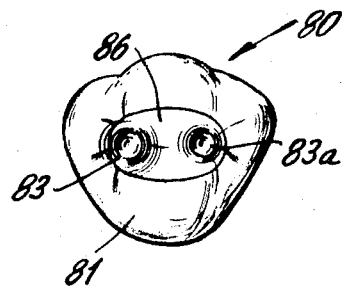
FIG. 8        FIG. 9
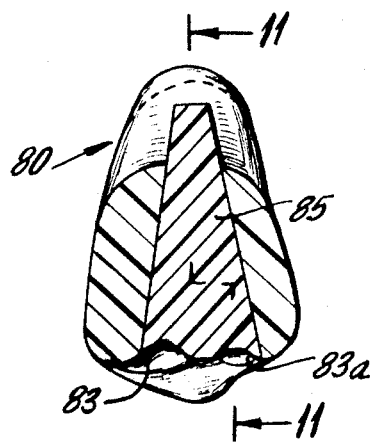
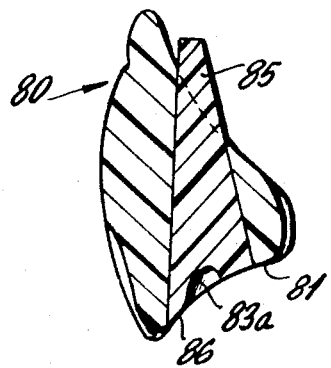
FIG. 10        FIG. 11
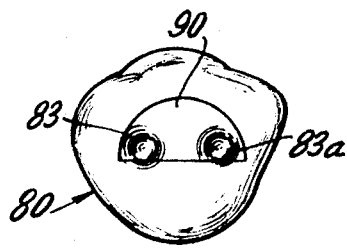
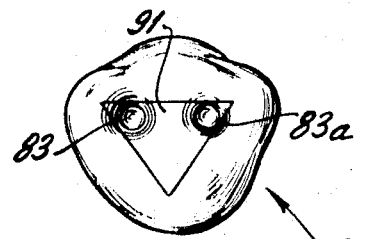
FIG. 12        FIG. 13
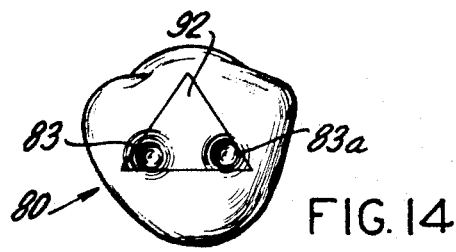
FIG. 14
INVENTOR.
S. CHARLES SPINELLA
ATTORNEYS.

United States Patent Office 3,456,347
Patented July 22, 1969

3,456,347
DENTAL RESTORATION AND DENTAL
TOOTH STRUCTURES
Salvatore Charles Spinella, 61—26 Parsons Blvd.,
Flushing, N.Y. 11365
Filed Oct. 17, 1966. Ser. No. 587,155
Int. Cl. A61c 13/08
U.S. Cl. 32—2                                     20 Claims

ABSTRACT OF THE DISCLOSURE

Preparation and construction of bridges and dentures utilizing of opposing cusps-to-fossae in each of the anterior and posterior regions of the mouth for attaining and maintaining an accurate maxillo-mandibular centric relation of the jaws.

In the anterior region upper cuspid teeth are provided with enlarged occlusal tables and include a generally conical fossa in each of the mesial and distal portions thereof. The mesial fossa receives the buccal eminence of the lower cuspid and the distal fossa is adapted to receive a cusp formed on the mesial portion of the lower first bicuspid. In the posterior region opposing cusps and fossae are provided on the second molars tips of the cusps positioned on an elevated horizontal plane which passes along the buccal eminence of the lower cuspid.

---

This invention relates generally to dental restoration, including bridges, full dentures, and partial dentures, and relates more particularly to a new and improved method for recording the maxillo-mandibular centric relationship for the construction of the required bridge or denture, and to certain new and improved denture tooth structures.

In the construction of bridges and artificial dentures, it is necessary that the centric relation of the upper (maxillary) and lower (mandibular) jaws be accurately attained. At the present time, the conventional procedures and techniques for preparing bridges and dentures are not capable of achieving an accurate reproduction of the centric relationship of a patient's mouth without the use of complicated and expensive articulators, time-consuming checks and rechecks of the bridge or denture in the patient's mouth, and exceptional professional skill. A major difficulty in these procedures is that the restoration is built up in a piecemeal fashion with intermediate checks and adjustments along the way. This permits introduction of innumerable errors into the completed restoration and ofttimes, adjustments made at an intermediate stage, for example, removal of lateral interferences, can prove to be excessive when the restoration is completed and there is then nothing to aid or guide the condyle movements of the jaw.

It is therefore an object of this invention to provide a new and improved method for the construction of bridges and dentures.

Another object of this invention is to provide a new and improved method for the construction of bridges and dentures which overcomes the aforesaid disadvantages of conventional techniques in dental restoration.

Another object of this invention is to provide a new ad improved method for the construction of bridges and dentures which attains an accurate maxillo-mandibular centric relationship with greatly improved reliability and without the need for exceptional professional skill.

Another object of this invention is to provide a new and improved method for the construction of bridges and dentures which eliminates many time-consuming steps and much effort in conventional dental restoration procedures.

Another object of this invention is to provide a new and improved method for the construction of bridges which incorporates the means for checking the maxillo-mandibular centric relationship in the bridge to be worn by the patient.

Another object of this invention is to provide a new and improved method for the construction of bridges and dentures which permits all the necessary adjustments for free movement and coordination of the jaws to be made in a limited number of specific areas.

Another object of this invention is to provide certain new and improved tooth structures for use in the construction of bridges and dentures.

Another object of this invention is to provide certain new and improved tooth structures for use in the construction of dentures which will guide the patient's mouth in an elliptical movement with a repetitive return to centric occlusion.

Another object of this invention is to provide a new and improved artificial bridge at the intermediate "try-in" stage in the process of building a completed bridge in wihch all lateral interferences are removed except for two opposed, matching cusp-to-fossa sets.

Another object of this invention is to provide a new and improved upper cuspid tooth structure.

Objects and advantages of the invention are set forth in part herein and in part will be obvious herefrom, or may be learned by practice with the invention, the same being realized and attained by means of the instrumentalities, steps, processes, and combinations pointed out in the appended claims.

The invention consists in the novel parts, steps, processes, constructions, arrangements, combinations and improvements herein shown and described.

Briefly described, the present invention is directed to a novel method for the preparation and construction of bridges and dentures, and to certain novel tooth structures, which utilize the concept of opposing cusps-to-fossae for both attaining and maintaining an accurate maxillo-mandibular centric relation of the patient's jaws.

As applied to a quadrant to quadrant bridge, upon obtaining the final or master impression of the missing tooth areas and adjacent prepared or abutment teeth of the patient's mouth, the method of the present invention includes mounting to the copings which fit onto the upper and lower prepared teeth opposing sets of cusps and fossae, the height and placement being determined by the information from the master impression. Preferably, there are two sets of opposing cusps-to-fossae; each set is adapted to mate substantially in the plane of the curve of Spee of the patient's jaws; the fossae are preferably mounted on the upper copings and the cusps are mounted on the lower copings; and each cusp and fossa is positioned on its respective coping so as to be in the long axis of the tooth to which the coping is fitted. Thereafter, the copings and luted cusps and fossae are joined by filling the missing tooth areas with a suitable resin material and the lower bridge is carved to simulate the normal anatomy of the missing teeth, as well as the teeth which serve as the abutments for the bridge. The resin material forming the upper bridge is provided with a space between the fossae, or cusps if that be the case, of sufficient depth such that there is no contact with the simulated tooth anatomy of the lower bridge except for the matching sets of cusps and fossae. The completed bridge quadrants are then inserted into the patient's mouth for checking the desired centric position. If each cusp strikes the center of its opposing fossa, the bridges properly correspond to the centric relation of the patient's jaws. If the cusp strikes a side wall of the fossa, the angle of the wall is increased until the cusp moves into the center of the fossa. Then centric position of the occlusal habit of the patient has now been recorded by the opposed sets of cusps and fossae. The cuspless space in the upper bridge is then filled in with a suitable stiff paste material and the centric position is secured. The bridges are then remounted and processed for completion.

As applied to a full reconstruction case, the method employs two cusp-to-fossa sets on each side of the posterior region of the patient's mouth. Thus, on the base trays which have been fabricated according to conventional procedures, upper and lower wax rims are formed on the anterior section and lower wax rims are formed on the molar area of the posterior section. Preferably on the upper base tray, two cusp rods are placed in the posterior section on each side—one cusp rod in the first bicuspid area and one cusp rod in the molar area. The base trays are then inserted in the mouth and the necessary information is recorded on the wax rims, including a recording of the centric position. A fossa rod is then secured to each side of the lower base tray so as to be in direct, opposed alignment with each of the cusp rods mounted in the first bicuspid area of the upper base tray, thereby "locking in" the centric position of the patient's jaws. This information is then transferred to the artificial dentures and the case is completed according to conventional procedures.

The novel tooth structures of the invention comprise a novel upper cuspid tooth and a novel arrangement of the upper and lower posterior quadrants for maintaining an accurate maxillo-mandibular centric relation in the artificial dentures and for guiding the jaws in an elliptical motion.

The novel upper cuspid tooth of the invention is provided with an enlarged occlusal table and includes two generally conical fossae formed in the occlusal table, one being formed in the mesial portion thereof and one in the distal portion thereof. The mesial fossa is adapted to receive the buccal eminence of the lower cuspid and the distal fossa is adapted to receive a cusp formed on the mesial portion of the lower first bicuspid.

The novel arrangement of the upper and lower posterior quadrants of a set of artificial dentures constructed in accordance with the invention comprises positioning a cusp on the lower second molar so that the tip thereof is located on an elevated, generally horizontal, plane which passes along the buccal eminence of the lower cuspid. The upper second molar and upper cuspid have fossae formed therein of a corresponding depth, whereby as the denture wearer moves into or out of occlusion, there are only four points of contact. These points of contact serve to guide the jaws in an elliptical motion.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

In the drawings:

FIGURE 8 is a perspective view of an upper cuspid tooth constructed in accordance with the invention and illustrating an alternate preferred embodiment of a denture tooth constructed in accordance with the invention;

FIGURE 9 is a bottom or occlusal plan view of the upper cuspid tooth shown in FIGURE 8;

FIGURE 10 is a front or buccal view, partly diagrammatic and partly in section taken along line 10—10 of the upper cuspid tooth shown in FIGURE 8;

FIGURE 11 is a side view, partly diagrammatic and partly in section taken along line 11—11 of FIGURE 10 of the upper cuspid tooth shown in FIGURE 8; and FIGURES 12–14 are bottom or occlusal diagrammatic views of an upper cuspid tooth constructed in accordance with the invention, illustrating modified forms of the tooth of FIGURE 8.

Figure 1:
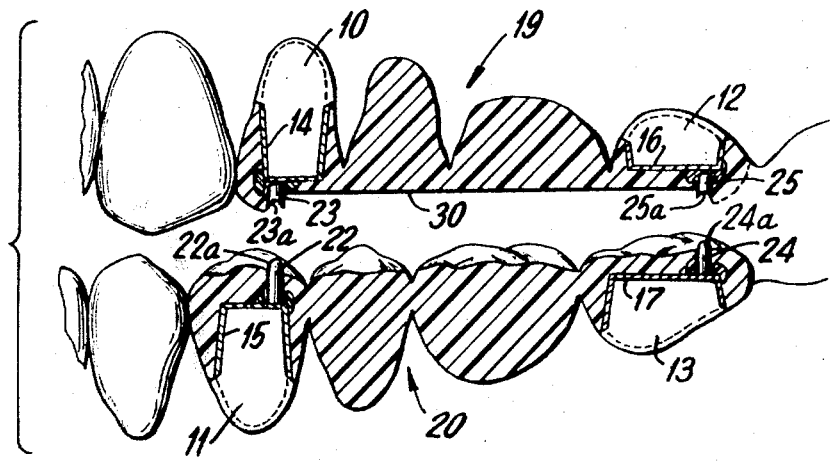
FIGURE 1 is a front lingual view, partly diagrammatic and partly in section, of an upper (maxillary) and lower (mandible) posterior quadrant of teeth in an open position, illustrating an embodiment of the invention as applied to crown and bridge dental restoration.
Figure 2:
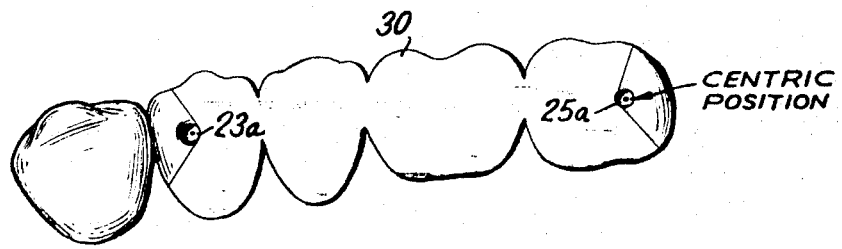
FIGURE 2 is a bottom or occlusal diagrammatic view of the upper posterior quadrant of FIGURE 1, illustrating the recording of a centric occlusion.
Figure 3:
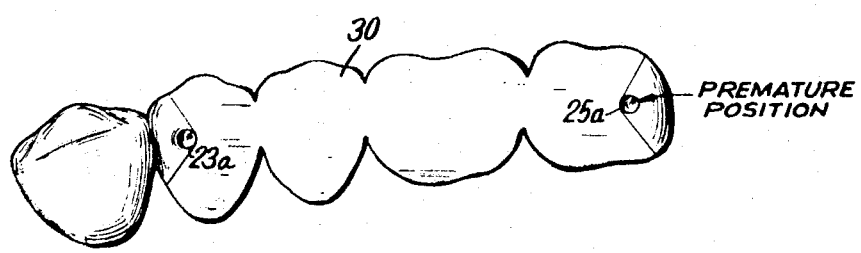
FIGURE 3 is a bottom or occlusal diagrammatic view of the upper posterior quadrant of FIGURE 1, illustrating the recording of a prematurity in a centric occlusion.

Referring now to the accompanying drawings, and more particularly to FIGURES 1–3, there is illustrated an embodiment of the invention as applied to an exemplary crown and bridge dental restoration case. In this case, two opposing teeth are missing in the upper and lower posterior quadrent of the right side of the patient's mouth, which are the respective second bicuspid and first molar. In accordance with convention preliminary procedures, from study casts of the patient's arches base trays are prepared with wax rims in the areas of the two missing teeth. The base trays are then inserted into the patient's mouth and the necessary information to establish the patient's normal centric position is recorded in the wax. Thereafter, the upper and lower teeth adjacent to the missing teeth, being in this case the respective first bisuspids and the second molars, are reduced to "prepared" or abutment form, illustrated by reference numerals 10, 11, 12, 13, respectively, in FIGURE 1, and a second "master" impression is taken according to suitable conventional techniques, such as by a hydrocolloid or rubber base impression. It will be understood that the "master" impression is taken for purposes of a double check of the accuracy of the first impression, or if marginal, ridge, connection or other corrections have been made after the first impression was taken. Thus, the skilled dentist may initially prepare the teeth into abutment form and obtain "master impressions as a single step.

Gold copings 14, 15, 16, 17 are thereafter fabricated for the "prepared" or abutment teeth 10, 11, 12, 13, respectively, and, on the basis of the information contained in the preliminary and master impressions, or the master impression alone, the embodiment of the invention as illustrated in FIGURES 1–3 is applied.

Thus, in accordance with a preferred embodiment of the invention, two sets of cylindrical rods 22, 23 and 24, 25 are mounted to the gold copings 15, 14 and 17, 16, respectively, the cylindrical rods having formed on their ends opposing cusps and fossae 22a, 23a and 24a, 25a, which are adapted to mate substantially in the plane of the "curve of Spee" of the patient's jaws. As illustrated, the cusp rods 22, 24 are preferably mounted in the lower segment of the bridge; one cusp-to-fossa is placed in the region of the first bicuspid teeth and the other cusp-to-fossa is placed in the region of the second molar teeth; and each cusp-to-fossa set is positioned on the long axis of the teeth so as to direct the masticatory forces in proportion to the long axis of the opposing teeth. Alternatively, the cusp rods 22, 24 may be mounted on the upper segment of the bridge and the fossa rods 23, 25 in the lower segment with equally satisfactory results.

The cusp and fossa rods are preferably constructed from a relatively hard substance so that when ground to acquire the centric position (more fully described hereinafter) this information is permanently retained. Suitable materials for this purpose are plastics such as Delrin, a polypropylene plastic manufactured by E. I. du Pont de Nemours, polytetrafluorethylene (Teflon polymers), and acrylic resins, and porcelain.

The cusp and fossa rods may be conviently placed in their desired positions by initially lightly securing them to the respective copings with sticky wax and then lined up so that in the closed position each of the lower cusps accurately mates with its opposing fossa substantially in the plane of the curve of Spee. After the cusps and fossae are properly positioned and aligned, they may then be suitably luted to the copings, for example, with a fast set acrylic resin material. However, it will be understood that the particular manner of luting will depend on the material from which the cusp and fossa rods are formed.

The upper and lower copings, with their respective cusps and fossae luted thereto are thereafter preferably joined together by a suitable acrylic resin bridge, indicated generally by reference numerals 19 and 20, respectively. The lower bridge 20 may be completely carved to simulate the anatomy of the natural teeth of a lower posterior quadrent. In the upper segment, only the first bicuspid and the second molar are carved to simulate tooth anatomy. The space on the upper segment between the fossa rods 23, 25, indicated by reference numeral 30, is left cuspless.

By providing the upper bridge cuspless between the two fossae 23a, 25a, all lateral interferences will be removed during the "try-in" of the bridges and only the opposing cusp-to-fossa sets will contact upon closing of the patient's mouth in checking the centric position of the patient's jaws.

Thus, the upper and lower segments of the completed bridge, with the upper segment being cuspless between the fossae 23a, 25a, are inserted into the mouth of the patient and checked for any necessary adjustments to be made, such as, for example, marginal corrections, bridge corrections, and connection corrections. The apexes of the two lower cusps 22a, 24a are then inked so that, upon closing, the ink on the cusp will make a mark on the respective matching fossa. If the mark is in the center of the opposing fossa, the patient is in a normal centric position and a correct fit is assured (see FIGURE 2). If a prematurity exists, a dot or a line will appear on the side wall of the fossa and will be immediately observed (see FIGURE 3). The fossa may then be simply adjusted by grinding the side wall with a burr, or other suitable device, so as to increase the angle of the wall and, consequently, decrease the lateral interference. This provides the patient with a greater degree of lateral movement and will permit the cusp to move into the center of the opposing fossa so as to achieve a centric position.

After obtaining the desired centric position, depending upon the theory of articulation used by the particular dentist, a suitable stiff paste material, such as a zinc oxide paste, may then be placed on the cuspless portion of the upper segment of the bridge and reinserted into the patient's mouth. Upon closing, with the two previously matched cusps-to-fossae in the centric position, the cusps on the curved lower segment of the bridge will form depressions in the paste material placed in the upper segment of the bridge, thereby securing the matched position of the cusps and fossae. Thus, when the birdge is returned to the laboratory for completion and processing with the desired material, the depressions in the paste ensure that the laboratory technican will accurately read the recorded centric position.

Figure 4:
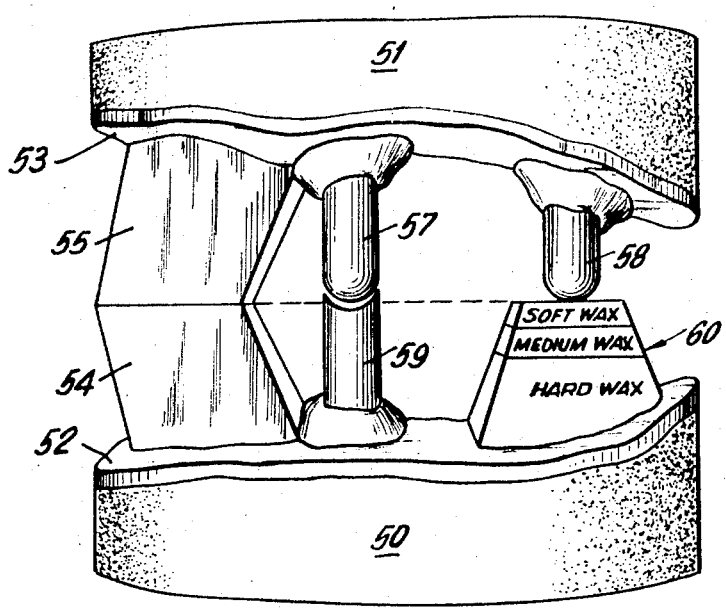
FIGURE 4 is a view, partly diagrammatic and partly in side elevation, of a stone cast model of the upper and lower portions of an edentulous mouth, illustrating a preferred application of the method of the invention in full denture restoration.

Referring now to FIGURE 4 of the accompanying drawings, there is illustrated an embodiment of the invention as applied to an exemplary full denture reconstruction case. Conventional preliminary procedures are followed to obtain the stone casts 50, 51, upon which the bases 52, 53, respectively, are built. Bases 52, 53 may be formed from any suitable material, such as chrome, gold, porcelain, acrylic, or vinyl.

In accordance with the invention, wax rims 54, 55 are formed on the respective bases 52, 53 in the anterior region of the mouth; two cusp rods are placed on each side of the mouth in the upper posterior region, one cusp rod 57 in the first bicuspid area and one cusp rod 58 in the molar area; a posterior wax rim, indicated generally by reference numeral 60, comprising suitable waxes of various hardnesses, is secured in the lower molar region; and a fossa rod 59 is placed on each side of the mouth in the lower first bicuspid area in alignment with the opposing cusp rod 57.

Initially, the lower fossa rods will be left off the base 52. The most posterior upper cusp rod 58 should strike the lower posterior wax rim 60 when the patient closes, and the desired information with respect to the centric relation of the jaws is then recorded on the wax rims 54, 55, 60.

The centric information recorded with the two posterior upper cusps and the posterior wax rims is then confirmed or "locked in" by securing a fossa rod 59 on each side of the lower base 52 in direct, opposed alignment with the cusp rods 57 previously mounted in the upper first bicuspid area. After the fossae 59 have been secured in matched alignment with the upper cusps 57, a suitable stiff paste wax is placed on the posterior wax rim and the centric position again recorded. There will thus be two positive posterior points of the centric relation of the patient's jaws on each side of the mouth.

It will thus be seen that the foregoing method, as in the crown and bridge example, permits the recording of the patient's centric position without lateral interferences in the posterior region, since only the cusps 58 strike the posterior bite rim 60. Thereafter, the centric information recorded on the posterior bite rim is "locked in" with the opposing cusp-to-fossa sets 57, 59, located in the first bicuspid area on each side of the mouth.

Thereafter, the full set of artificial dentures is constructed from the information recorded on the model so as to guide the jaws in an ellpitical motion with a repetitive return to centric occlusion, in accordance with the invention.

To this end, the posterior quadrant portions of both the upper and lower dentures are provided with two opposing sets of cusps and fossae which are adapted to provide the initial contact between the teeth upon closing the mouth and thereby guide the jaws into centric occlusion. Additionally, a novel upper cuspid tooth is provided, having two conically-shaped fossae therein, adapted to receive the buccal eminence of the lower cuspid and a correspondingly conically-shaped cusp formed on the mesial buccal cusp of the lower first bicuspid.

Figure 5:
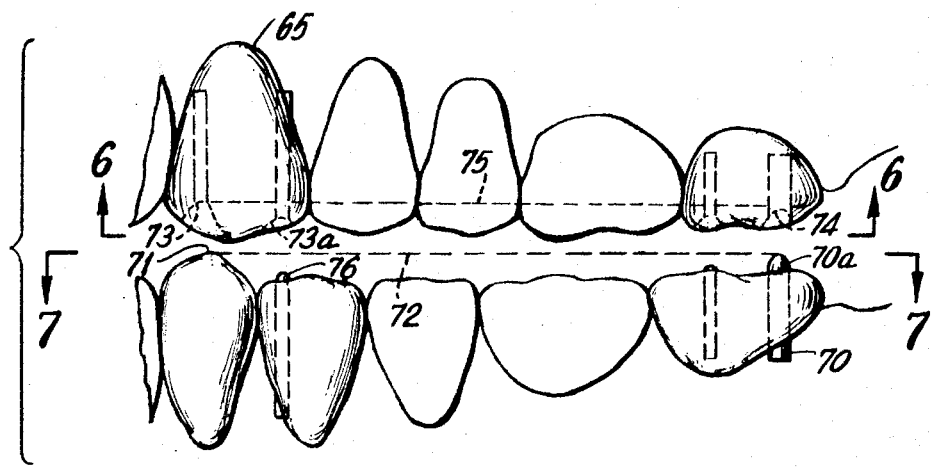
FIGURE 5 is a front or buccal diagrammatic view of an upper (maxillary) and lower (mandible) posterior quadrant of a set of artificial denture teeth for an edentulous patient, shown in an open position, illustrating a further embodiment of the invention.
Figure 6:
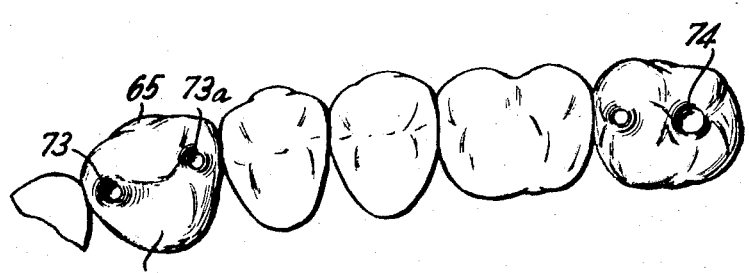
FIGURE 6 is a bottom or occlusal plan view of the upper posterior quadrent shown in FIGURE 5.
Figure 7:
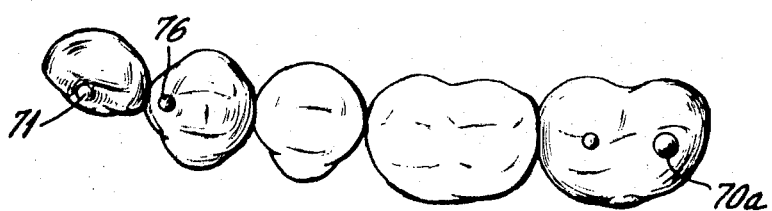
FIGURE 7 is a top or occlusal plan view of the lower posterior quadrent shown in FIGURE 5.

Referring more particularly to FIGURES 5–7, illustrating a preferred embodiment of one side of the posterior quadrant of a set of upper and lower dentures constructed in accordance with the invention, it being understood that the other side is identical, the lower cuspid tooth and the cusp rod 70, mounted on the distal portion of the lower second molar, are positioned such that the buccal eminence 71 of the lower cuspid is located in substantially the same elevated plane as the apex of the cusp 70a, formed on the end of rod 70. The elevated plane is illustrated by dotted line 72 and is desirably substantially parallel to the plane of the curve of Spee of the patent's jaws.

The upper dentures of the invention include a novel upper cuspid tooth 65, shaped in the natural anatomy of a cuspid tooth on the buccal side but shaped to simulate the anatomy of an upper bicuspid tooth on the lingual side. Thus, upper cuspid 65 is provided with an enlarged occlusal table 66, the latter having formed therein two generally conically-shaped fossae 73, 73a in the mesial and distal portions, respectively. The mesial fossa 73 of the upper cuspid and the fossa 74 located in the distal portion of the upper second molar are each formed such that the bottoms thereof are located in substantially the same plane, illustrated by the dotted line 75, parallel to the plane 72. Of course, it will be understood that planes 72 and 75 coincide when the jaws are closed.

In closing, the mesial fossa 73 of the upper cuspids 65 initially contact the buccal eminence 71 of the lower cuspids and serve to guide the jaws toward a centric position. Thereafter, the opposing cusps and fossae 70, 74 on the distal portions of the upper and lower second molars complete the guidance of the jaws into centric occlusion. In opening, it will be understood that the foregoing functions of the opposing cusps and fossae are reversed.

It will thus be seen that as the denture wearer moves into and out of occlusion, there are four points of first and last contact, these being the mesial fossae 73 of the upper cuspids 65 contacting the buccal eminence 71 of the lower cuspids, and the most distal lower cusps 70a contacting the most distal upper fossae 74 of the second molars. The gradual angle of the fossa wall at these four points of contact creates a motion simulating the natural elliptical movement of the jaws with a repetitive return to centric occlusion.

In addition, upon closing the jaws into a position of centric occlusion, the novel upper cuspid 65 interdigitates with the lower first bicuspid whereby the distal fossa 73a receives and mates with a cusp 76 formed on the mesial buccal cusp of the lower first bicuspid tooth. Thus, the upper cuspid tooth constructed in accordance with the invention provides an added point of contact in the anterior region of the mouth over that provided in natural tooth anatomy. This anterior contact serves to balance the masticatory stresses between the anterior and posterior regions of the mouth and protects against bruxism.

Advantageously, as illustrated in FIGURE 5, the upper cuspids, lower first bicuspid, and upper and lower second molars may be formed from a plastic material, such as an acrylic resin, and the cusps and fossae formed on the ends of stress receiving cylindrical rods formed from a high wear-resistant material, such as Delrin, a polypropylene plastic manufactured by E. I. du Pont de Nemours & Co. The remaining posterior teeth may be carved to simulate the natural tooth anatomy and formed from any suitable material, such as porcelain. Of course, it will be understood that all the teeth may be formed from a high wear-resistant material such as porcelain, in which case it will be understood that the stress-bearing rods illustrated in FIGURE 5 may be eliminated.

Referring now more particularly to FIGURES 8-11, there is illustrated an alternate preferred embodiment of an upper cuspid tooth constructed in accordance with the invention, indicated generally by reference numeral 80. This tooth is similar to upper cuspid 65 in that it is provided with an occlusal table 81 resembling the natural anatomy of an upper biscuspid tooth and is further provided with both a mesial fossa 83 and a distal fossa 83a. The upper cuspid 80 is, however, provided with an integral stem 85 along its long axis, stem 85 being tapered so as to provide a base 86 at the occlusal table in which the base and a major portion of the circumferentially extending side walls of each of the fossae 83, 83a may be formed. Advantageously, stem 85 is formed from a high wear-resistant material, such as Delrin, and the remainder of the tooth may then be formed from any suitable material having less wear-resistant properties, such as an acrylic resin plastic.

Referring to FIGURES 12-14, there are illustrated still further modifications in the shape of the stem provided integral with upper cuspid tooth 80, indicated by reference numerals 90, 91, and 92, respectively.

While it will be understood that the specific dimensions for the cusps and fossae in both bridge and denture reconstruction will vary from case to case, depending on the patient's condyle movements, certain dimensions have been found to provide particularly satisfactory results. Thus, in both bridge and denture reconstructions, it has been found satisfactory to fabricate the circumferentially extending side wall of the fossae with an angle of about 5°–10° and that, in fitting a particular patient, this angle may be increased up to about 35°. In bridges, the fossae preferably are about .75–1.5 mm. deep; 3 mm. in diameter at the top; and 1 mm. in diameter at the base. In dentures, these latter dimensions are preferably enlarged slightly.

What is claimed is:

1. In a set of natural or artificial teeth, the improvement therein which comprises: an artificial tooth structure located in the position normally occupied by the upper cuspid tooth in the natural anatomy, said artificial tooth structure having an occlusal table in which there is formed a fossa receptacle in the mesial portion thereof for receiving in occlusion the buccal eminence of the corresponding lower cuspid tooth, thereby providing an anterior point of contact which serves to balance the masticatory stresses between the anterior and posterior regions of the mouth.

2. The improvement defined in claim 1, in which the set of teeth includes artificial lower first bicuspid teeth having cusps formed in the mesial buccal cusp portions thereof and said artificial tooth structure located in the position normally occupied by the upper cuspid tooth in the natural anatomy further includes a fossa receptacle in the distal portion of the occlusal table for receiving in occlusion the aforesaid cusp of the corresponding lower first bicuspid tooth.

3. The improvement as defined in claim 2, wherein each of said mesial and distal fossae are formed in the shape of a cone and the angle of the circumferentially extending side wall thereof is from about 5° to about 35°.

4. The improvement defined in claim 2, wherein said artificial tooth structure located in the position normally occupied by the upper cuspid tooth in the natural anatomy is constructed of a resin material and includes at least one integral stem member extending on the long axis of the tooth from the bases of said fossae, said stem member being constructed from a wear-resistant material.

5. A tooth as claimed in claim 4 wherein said resin material is acrylic and said wear-resistant material is a polypropylene plastic.

6. Artificial upper and lower dentures, including a buccal cusp on each of the lower second molars terminating in the plane of the curve of Spee which passes through the buccal eminence of the lower cuspids, upper cuspid teeth having occlusal tables, said tables each including a central mesial fossa therein adapted to receive in occlusion the buccal eminence of the corresponding lower cuspid, a central fossa in each of the upper second molars adapted to receive in occlusion the corresponding cusps on the lower second molars, whereby upon going into and coming out of occlusion there are four points of contact which guide the jaws in a natural elliptical motion into and out of centric occlusion.

7. Artificial dentures as claimed in claim 6, wherein the molar cusps and fossae are formed in the distal portions of the second molars.

8. Artificial dentures as claimed in claim 6, including a central distal fossa in the occlusal table of each of said upper cuspids and a cusp on the mesial buccal cusp of each of the lower first bicuspids said fossae being adapted to receive said cusps in occlusion.

9. Artificial dentures as claimed in claim 8, wherein one of said mesial and distal fossae of each of the upper cuspids has a larger diameter at the surface of the occlusal table than the other.

10. Artifical dentures as claimed in claim 8, wherein the angle of the side wall of each of the fossae is from 5° to 35°.

11. Artificial dentures as claimed in claim 8, wherein the upper and lower cuspids and second molars and the lower first bicuspid are constructed of a resin material and each of said cusps and fossae are constructed from a wear-resistant material.

12. Artifical dentures as claimed in claim 8, wherein said resin material is acrylic and said wear-resistant material is a polypropylene plastic.

13. An artificial posterior trial bridge for recording and maintaining a patient's maxillo-mandibular centric relationship comprising, upper and lower posterior segments having opposing sets of cusps and fossae in the first bicuspid and second molar regions, at least one of said segments of said bridge being cuspless between said opposing sets of cusps and fossae, whereby upon insertion of the bridge into the mouth only the opposing sets of cusps and fossae contact to thereby record the centric relationship of the patient's jaws.

14. A bridge as claimed in claim 13, wherein said cusps and fossae are formed on the ends of cylindrical rods secured to the bridge segments, the cusp rods are secured to the lower segment and the fossa rods are secured to the upper segment, and the lower segment of the bridge is carved to simulate the natural anatomy of the missing teeth.

15. A bridge as claimed in claim 13 wherein the angle of the side wall of each of the fossae is from 5° to 35°.

16. In denture restoration, a method for recording the patient's maxillo-mandibular centric relationship including the steps of preparing base trays, placing upper and lower wax rims on the anterior region of the base trays and lower wax rims on the molar area of the posterior region, securing cusped cylindrical rods on the upper base tray in the molar area of the posterior region, inserting the prepared trays in the mouth and recording a centric position, removing the trays from the mouth and securing cusp and fossa rods in the first bicuspid area of the upper and lower base trays in opposed alignment, reinserting the base trays into the mouth and taking a second recording of the centric position of the patient's jaws.

17. In posterior crown and bridge dental restoration, a method for recording and maintaining the patient's maxillo-mandibular centric relationship, including the steps of: securing two opposing sets of cusps and fossae to copings adapted to be anchored to abutment teeth, joining the copings with a resin material so as to form upper and lower bridge segments, removing the occlusal portion of at least one of said segments between the opposing sets of cusps and fossae, inserting the prepared bridge in the patient's mouth, and recording the centric relationship of the patient's jaws on the opposing sets of cusps and fossae.

18. A method as claimed in claim 17, including the step of carving one of said segments so as to simulate the natural anatomy of the missing and abutment teeth prior to the step of inserting the bridge into the mouth.

19. A method as claimed in claim 17, including the step of inking each cusp in each set of opposing cusps and fossae, whereby the centric relationship of the patient's jaws is recorded by an ink mark left on each of the opposing fossae upon closing of the mouth.

20. A method as claimed in claim 17, including the step of adjusting the lateral interferences of each of the fossae where a prematurity in centric occlusion is recorded.

References Cited

UNITED STATES PATENTS 3,105,300  10/1963  Beresin _____ 32—2

ROBERT PESHOCK, Primary Examiner